United States Patent
Roozeboom et al.

(10) Patent No.: US 10,690,493 B2
(45) Date of Patent: Jun. 23, 2020

(54) WIRELESS SENSOR DEVICE AND SOFTWARE SYSTEM FOR MEASURING LINEAR POSITION OF A ROTATING OBJECT

(71) Applicant: Myriad Sensors, Inc., Mountain View, CA (US)

(72) Inventors: Clifton Roozeboom, Mountain View, CA (US); David Bakker, San Jose, CA (US); Andrew Bellay, San Francisco, CA (US)

(73) Assignee: Myriad Sensors, Inc., Mountain View, CA (US)

( * ) Notice: Subject to any disclaimer, the term of this patent is extended or adjusted under 35 U.S.C. 154(b) by 356 days.

(21) Appl. No.: 15/680,498

(22) Filed: Aug. 18, 2017

(65) Prior Publication Data
US 2018/0051985 A1 Feb. 22, 2018

Related U.S. Application Data

(60) Provisional application No. 62/376,651, filed on Aug. 18, 2016.

(51) Int. Cl.
*G01S 5/00* (2006.01)
*G01C 15/00* (2006.01)
(Continued)

(52) U.S. Cl.
CPC ............ *G01B 21/16* (2013.01); *G01C 19/02* (2013.01); *G01P 3/00* (2013.01); *G01P 3/54* (2013.01); *G01P 3/66* (2013.01)

(58) Field of Classification Search
CPC ...... G01C 15/00; G01C 21/165; G01C 21/20; G01C 21/10; G01C 19/02; G01P 15/0891;
(Continued)

(56) References Cited

U.S. PATENT DOCUMENTS 6,332,103 B1 * 12/2001 Steenson, Jr. ............ A61G 5/04
172/9
6,928,382 B2 * 8/2005 Hong ........................ G01P 7/00
702/141

(Continued)

*Primary Examiner* — Mohammad K Islam
(74) *Attorney, Agent, or Firm* — Hickman Palermo Becker Bingham LLP (57) ABSTRACT

A computer system comprises a sensor device configured to attach to a rotating object. The sensor device has a gyroscopic sensor that is configured to measure rotational motion on one or more planes. The sensor device detects rotational movement and generates and transmits signals that represent the rotational movement detected to a mobile computing device. The mobile computing device receives the signals and assigns timestamp values to the signals. The mobile computing device also receives object parameter information that describes object attributes. The mobile computing device generates angular velocity datasets and object datasets that describe motion or positions of the object. The mobile computing device then generates sets of graphical representations from the object datasets and displays graphs from the sets of graphical representations, where each graph displayed is obtained from a distinct set of graphical representations.

11 Claims, 9 Drawing Sheets

(51) Int. Cl.
*G01B 21/16* (2006.01)
*G01P 3/00* (2006.01)
*G01C 19/02* (2006.01)
*G01P 3/66* (2006.01)
*G01P 3/54* (2006.01)

(58) Field of Classification Search
CPC ..... G01P 3/00; G01P 3/66; G01P 3/54; G01B 21/16
See application file for complete search history.

(56) References Cited

U.S. PATENT DOCUMENTS

| | | | | |
|---|---|---|---|---|
| 8,818,571 | B1* | 8/2014 | Iida | A63H 30/04 446/456 |
| 9,405,372 | B2* | 8/2016 | Yen | A63F 13/06 |
| 9,494,694 | B1* | 11/2016 | Dong | G01S 19/39 |
| 9,842,438 | B1* | 12/2017 | Bradley | B60T 8/172 |
| 2003/0009266 | A1* | 1/2003 | Yamada | B60T 8/172 701/1 |
| 2003/0234318 | A1* | 12/2003 | Neff | B64C 39/001 244/62 |
| 2005/0134503 | A1* | 6/2005 | Colley | G01S 19/05 342/357.58 |
| 2007/0078594 | A1* | 4/2007 | Mori | G01C 21/12 701/408 |
| 2007/0147803 | A1* | 6/2007 | Harada | G11B 27/105 386/232 |
| 2009/0080697 | A1* | 3/2009 | Kishikawa | G01C 15/00 382/103 |
| 2009/0177382 | A1* | 7/2009 | Alles | G01C 25/00 701/532 |
| 2009/0295722 | A1* | 12/2009 | Yamamoto | G06F 3/0346 345/158 |
| 2010/0103096 | A1* | 4/2010 | Yamamoto | G06F 3/0346 345/157 |
| 2011/0025562 | A1* | 2/2011 | Hol | G01S 5/0247 342/387 |
| 2011/0257882 | A1* | 10/2011 | McBurney | G01C 21/30 701/532 |
| 2012/0259479 | A1* | 10/2012 | Yoneta | B62H 7/00 701/1 |
| 2013/0158941 | A1* | 6/2013 | Yang | G01C 21/10 702/141 |
| 2013/0268186 | A1* | 10/2013 | Yamashiro | G06F 17/00 701/300 |
| 2014/0149145 | A1* | 5/2014 | Peng | G06F 3/0346 705/4 |
| 2014/0278206 | A1* | 9/2014 | Girod | G01C 15/00 702/141 |
| 2015/0300827 | A1* | 10/2015 | Malalur | G01C 21/30 701/410 |
| 2016/0091324 | A1* | 3/2016 | Horihata | G08G 1/0112 701/417 |
| 2016/0171864 | A1* | 6/2016 | Ciaramelletti | A42B 3/046 340/539.12 |
| 2016/0203660 | A1* | 7/2016 | Chowdhury | G07C 5/0841 701/33.4 |
| 2016/0299234 | A1* | 10/2016 | Zeng | G01S 13/86 |
| 2017/0191244 | A1* | 7/2017 | Berkemeier | E02F 9/2045 |
| 2018/0112987 | A1* | 4/2018 | Matsunaga | G01C 21/26 |
| 2019/0120632 | A1* | 4/2019 | Daikoku | G01C 21/30 |

* cited by examiner

WIRELESS SENSOR DEVICE AND
SOFTWARE SYSTEM FOR MEASURING
LINEAR POSITION OF A ROTATING
OBJECT

BENEFIT CLAIM

This application claims the benefit under 35 U.S.C. § 119(e) of provisional application 62/376,651, filed Aug. 18, 2016, the entire contents of which is hereby incorporated by reference for all purposes as if fully set forth herein.

FIELD OF THE DISCLOSURE

The present disclosure generally relates to the technical field of computer-implemented measurement of physical objects. The disclosure relates more specifically to wireless sensors in the field of determining motion and position of an object using a sensor to detect rotational movement of the object.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

Determining position, speed, and acceleration of objects can be performed using electro-mechanical systems. For example, bicycles and cars have mechanical or electronic speedometers with sensor components that measure the time it takes for each revolution of a wheel or a driveshaft. These sensor components generally use two pieces of equipment, a magnetic device mounted on the wheel or driveshaft and a sensor component mounted at a fixed location, which is configured to detect revolutions by detecting each time the magnetic device passes the sensor. Then the number of revolutions per unit of time is used to calculate speed and acceleration with respect to the wheel or driveshaft where the magnetic device is mounted. Other examples of speedometers may use sensor components that include a specially designed pattern that is either painted or affixed to the wheel or other rotating object in conjunction with an optical sensor component configured to identify when the pattern passes by the sensor to measure the number of revolutions within a period.

However, these techniques generally require multiple sensor components to be positioned and configured to work together to calculate velocity, acceleration, and position. Configuring and positioning multiple sensor components requires significant time and effort to set up and calibrate.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. For purposes of clarity and conciseness, in some instances this disclosure refers to certain data values, which are stored and used in electronic digital form in memory or non-volatile storage, using labels that represent concepts or abstractions. However, each instance in this detailed description of using or referring to an abstract item or concept is intended to encompass one or more electronically digitally stored instructions or data values that represent or correspond to the specified abstract item or concept. In other words, the disclosure is directed to practical applications of the concepts described herein using the particular computers, computer memory, computer storage, and computer communications that are described herein, and is not intended to encompass all means of implementing the abstract items or concepts nor to encompass the abstract items or concepts themselves. Embodiments are disclosed in sections according to the following outline:

1. GENERAL OVERVIEW
    2. SYSTEM OVERVIEW
    2.1. SENSOR DEVICE
    2.2. MOBILE COMPUTING DEVICE
    2.3. SERVER-SIDE BACKEND COMPUTER
    3. FUNCTIONAL OVERVIEW
    3.1. DETECTING ROTATIONAL MOVEMENT
    3.2. CALCULATING OBJECT MOTION AND POSITION
    3.3. DISPLAYING OBJECT MOTION AND POSITION DATA
    3.4. DATA CALIBRATION
    4. EXTENSIONS AND ALTERNATIVES
    5. HARDWARE OVERVIEW

1. General Overview

In an embodiment, a motion sensing system comprises a sensor device configured with the capability to be affixed to an object that rotates. The sensor device includes one or more processors, a gyroscopic sensor, a wireless network transceiver, and non-transitory computer-readable storage medium coupled to the one or more processors and storing one or more sequences of instructions. The gyroscopic sensor is coupled to the one or more processors and is configured to measure rotational motion of the sensor device on one or more planes. The instructions stored on the non-transitory computer-readable storage medium may be programmed to cause one or more processors to detect rotational movement, using the gyroscopic sensor, of the sensor device, generate one or more signals that represent the rotational movement detected, and transmit the one or more signals, using the wireless network transceiver, to a mobile computing device.

The mobile computing device comprises a second non-transitory computer-readable storage medium storing downloadable application instructions which when downloaded to and executed by the mobile computing device cause the mobile computing device to receive the one or more signals from the sensor device. The downloadable application instructions cause the mobile computing device to receive object parameter information that describes attributes of the object to which the sensor device is affixed. The downloadable application instructions cause the mobile computing device to assign timestamp values to the one or more signals received from the sensor device. The timestamp values are obtained from an internal clock within the mobile computing device. The mobile computing device then generates one or more angular velocity datasets comprising a plurality of values representing a plurality of measurements that are based on the one or more signals and the timestamp values assigned to the one or more signals. The mobile computing device then generates one or more object datasets that describe motion or positions of the object over a particular period, where each object dataset includes calculated data values with associated timestamps that are based on the object parameter information and the one or more angular velocity datasets. The timestamp values associated with the calculated data values are based on the timestamp values associated with the one or more signals used to generate the plurality of values that make up the one or more angular velocity datasets.

The mobile computing device generates two or more sets of graphical representations from calculated data values within the one or more object datasets. Each graphical representation, of the two or more graphical representations, generated includes a subset of calculated data values and is associated with a particular timestamp value. The mobile computing device then displays, on a display device that is communicatively coupled to the mobile computing device, two or more graphs from the two or more sets of graphical representations, where each of the graphs displayed is obtained from a distinct set of the two or more sets of graphical representations.

2. System Overview 2.1 Sensor Device

Figure 1:
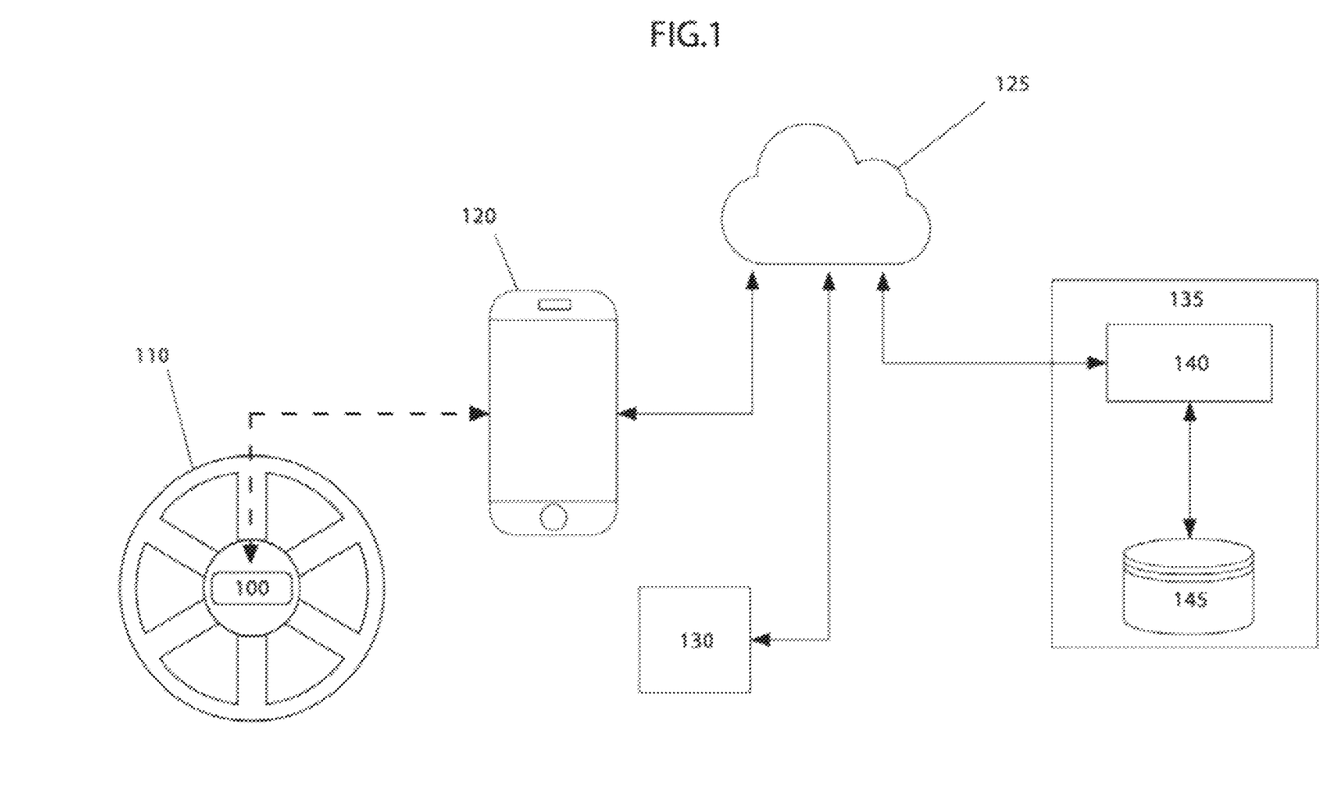
FIG. 1 illustrates an example computer system for measuring gyroscopic data and displaying motion and position information for an object and using a mobile computing device.

FIG. 1 illustrates an example computer system for measuring gyroscopic data and displaying motion and position information for an object and using a mobile computing device.

In an embodiment, a sensor device 100 may be configured to attach to a separate object 110 for measuring rotational motion to determine acceleration, velocity, and positional information of the object 110 when the object 110 moves. The object 110 may be a wheel, cylinder, shaft, gear, ball, or any other object that rotates around one or more axes. The mobile computing device 120 is connected to a network 125, through which the mobile computing device 120 can communicate with server-side backend computer system 135 and a web interface 130. The server-side backend computer system 135 may implement cloud networking for sharing data between users of multiple multi-sensor devices. The web interface 130 is a graphical user interface that allows the user to interact with the captured sensor data. The web interface 130 may comprise a web browser such as Internet Explorer, Google Chrome, or Mozilla Firefox, running on a computer.

Figure 3:
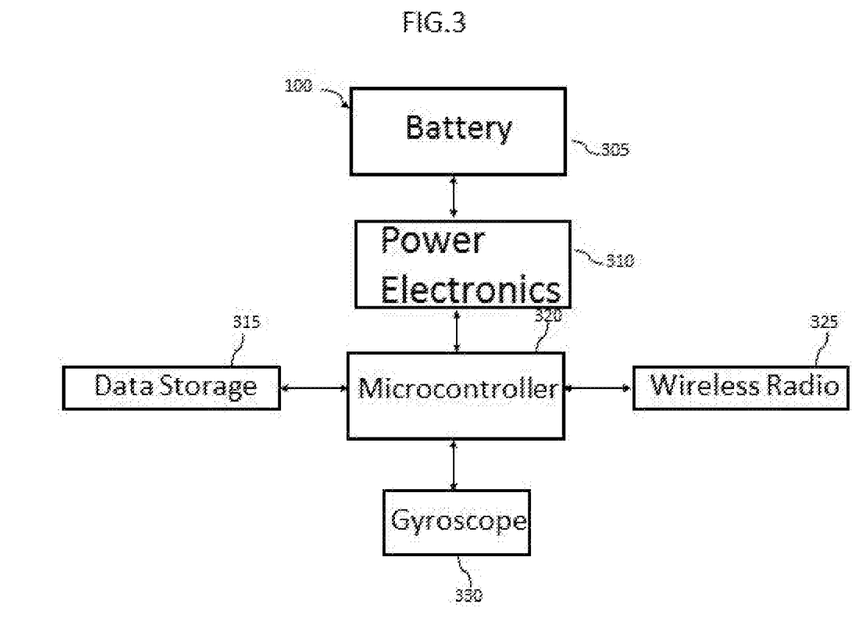
FIG. 3 illustrates inner components of the sensor device and their functional connections.

FIG. 3 illustrates inner components of the sensor device and their functional connections.

In an embodiment, a battery 305 provides power unit for the sensor device 100, and may be coupled to power electronics 310, which may be configured to regulate voltage from the battery 305 to maintain power requirements for the sensor device 100. Power electronics 310 and battery 305 may form a regulated DC power supply and may implement power conservation logic. For example, if the sensor device 100 has not detected any change in the environment or position of the object 110, the sensor device 100 may switch to a sleep or power saving mode to conserve the limited power stored in the battery 305. In this example, the power electronics 310 may regulate the power consumption to the microcontroller 320 or other components by restricting the total power throughput from the battery 305 or by selectively turning off select components, such as sensors or wireless radio 325, within the sensor device 100.

In an embodiment, the microcontroller 320 is configured to perform specific data input and output tasks between the other components within the sensor device 100. For example, the microcontroller 320 is configured to receive sensor data from the gyroscope 330 and send the sensor data to the data storage unit 315 for temporary or permanent storage. The microcontroller 320 is also configured to send the stored sensor data to the wireless radio 325 where the sent sensor data is then wirelessly transmitted to the mobile computing device 120.

In an embodiment, the data storage unit 315 within the sensor device 100 may include, but is not limited to, a magnetic disk, optical disk, solid-state drive, or other dynamic storage media. In an embodiment, the wireless radio 325 is configured to transmit sensor data via a wireless network using communications such as Bluetooth, Bluetooth low energy, WiFi, ZigBee, or any other wireless protocol.

In an embodiment, the microcontroller 320 is coupled to one or more sensors and is configured to send sensor setting information to the sensors and receive sensor data. FIG. 3 depicts the sensor device 100 containing a gyroscope sensor 330. Other embodiments may contain any number of sensors. In an embodiment, gyroscopic sensor 330 is a three-axis gyroscope configured to measure rotational motion over multiple planes. An example of the three-axis gyroscope is a microelectromechanical system (MEMS) gyroscope. MEMS gyroscopes include integrated circuits to provide either analog or digital outputs. Examples of outputs may include the rate of rotation over multiple planes, such as output measurements along an x-axis, y-axis, and z-axis.

Figure 2:
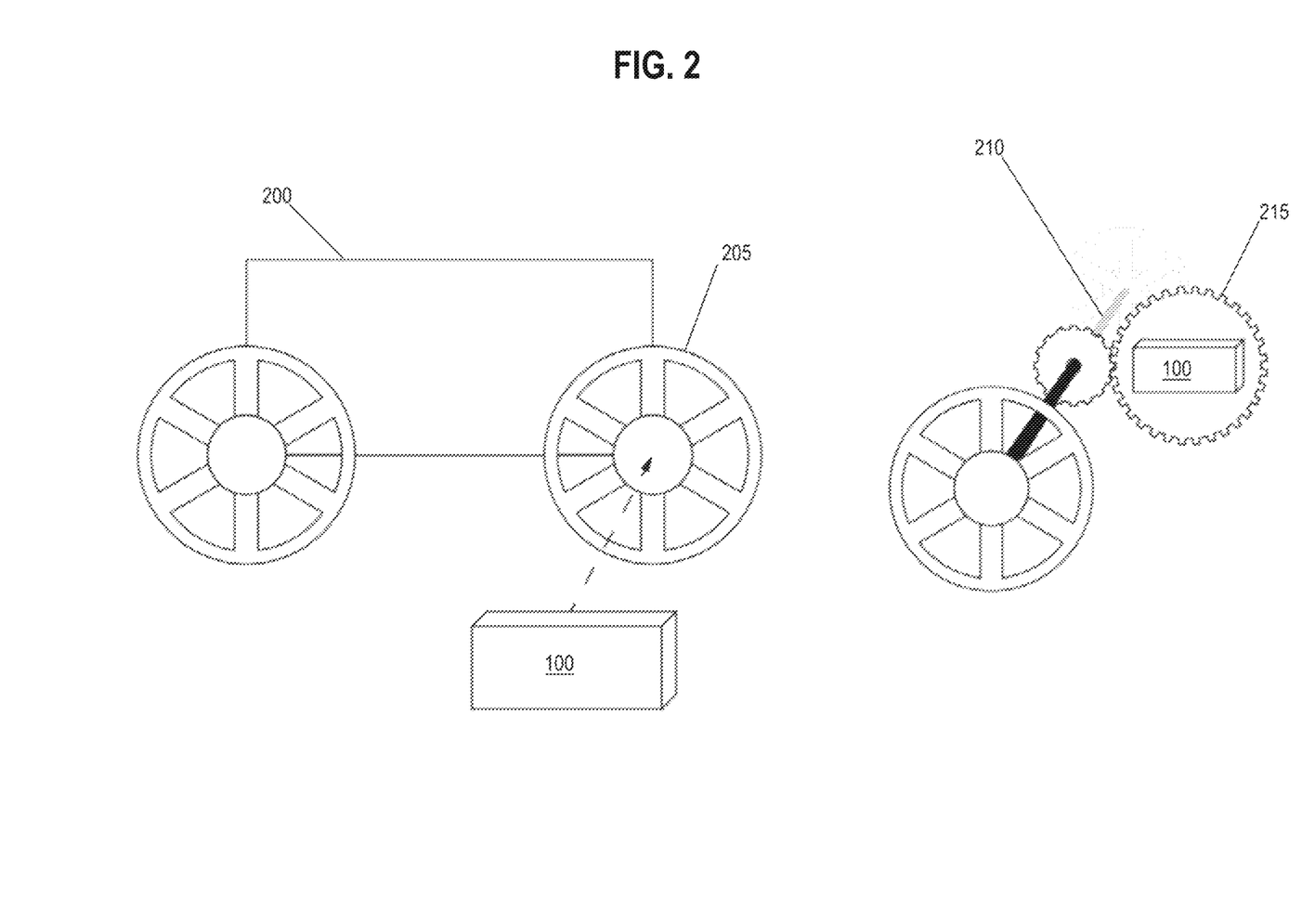
FIG. 2 illustrates examples of a sensor device mounted on different rotating objects.

FIG. 2 illustrates examples of a sensor device mounted on different rotating objects.

The sensor device 100 may be mounted to different types of objects 110. In an embodiment, object 110 represents a wheel 205 that is connected to a wheeled vehicle 200, such as an automobile, and the sensor device 100 is attached to the wheel 205 for the purpose of measuring rotational movement of the wheel 205. Sensor data of the rotational movement of the wheel 205 may be sent to a mobile computing device 120 for the purpose of determining acceleration, velocity, and position of the wheel 205 during or after the wheel 205 has moved. The determined acceleration, velocity, and position of the wheel 205 may also be used to represent acceleration, velocity, and position of the wheeled vehicle 200 as the wheel 205 is directly attached to the body of the wheeled vehicle 200. In other embodiments, the sensor device 100 may be attached to separate a trundle wheel, which may then be attached to the wheeled vehicle 200, for the purpose of determining acceleration, velocity, and position of the wheeled vehicle 200.

In the embodiment depicted in FIG. 2, sensor device 100 is shown attached to the wheel 205 at the center of the axis of rotation of the wheel 205. Placement location of the sensor device 100 on the wheel 205, or any other object 110, is not limited to placing the sensor device 100 on the center of the axis of rotation. The sensor device 100 may be attached at any position on the object 110. For example, if the sensor device 100 is placed on the outer edge of the wheel 205, the sensor device 100 is still able to detect rotational movement along the axis of rotation of the wheel 205. If the wheel 205 completes a single revolution, the sensor device 100 will still detect the single revolution regardless of whether the sensor device 100 is placed at the center of the axis of rotation of the wheel 205 or placed at any other location on the wheel 205.

FIG. 2 also depicts the sensor device 100 attached to a gear 215. The gear 215 may be coupled to another gear attached to an axle 210 of a vehicle. In an embodiment, the sensor device 100 may detect rotational movement of the gear 215 which may be used by the mobile computing device 120 to determine acceleration, velocity, and position of the gear 215 during or after the gear 215 has moved. In an embodiment, acceleration, velocity, and position of the axle 210 and wheels attached to the axle 210 may be calculated based upon a gear ratio between the gear 215 and the connecting gears on the axle 210.

2.2. Mobile Computing Device

In an embodiment, the mobile computing device 120 is a laptop computer, tablet computer or smartphone that connects to the sensor device 100 using a wireless networking protocol. The mobile computing device 120 may be configured to download the downloadable application instructions using a standard web browser or a stand-alone app store program such as the APPLE APP STORE. In an embodiment, the downloadable application instructions may include a downloadable dashboard application that is used to communicate with the sensor device 100 and a server-side backend computer system 135 and to display the received sensor data on a multi-axis graph for the user.

In an embodiment, the mobile computing device 120 uses communication protocols including, but not limited to, Bluetooth, Bluetooth low energy, WiFi, or Zigbee, to communicate with the sensor device 100. The mobile computing device 120 may also use multiple communication protocols to communicate the received sensor data to the server-side backend computer system 135.

2.3. Server-Side Backend Computer

In an embodiment, the server-side backend computer system 135 may be implemented using one or more server computers or a distributed cloud infrastructure. The server-side backend computer system 135 may comprise server software including Representational State Transfer (REST) APIs that are used to send and receive data and data requests from multiple mobile computing devices connected via the network 125. In an embodiment, data received from multiple mobile computing devices may be persistently stored within a storage database 145. Embodiments of the storage database 145 include, but are not limited to, relational databases, object databases, or any other data management system.

In an embodiment, the storage database 145 may be used to organize the data received from the mobile computing device 120 based upon the sensor device 100 and any other annotated notes related to the data such as an experiment name, user, or user group.

3. Functional Overview

Figure 4:
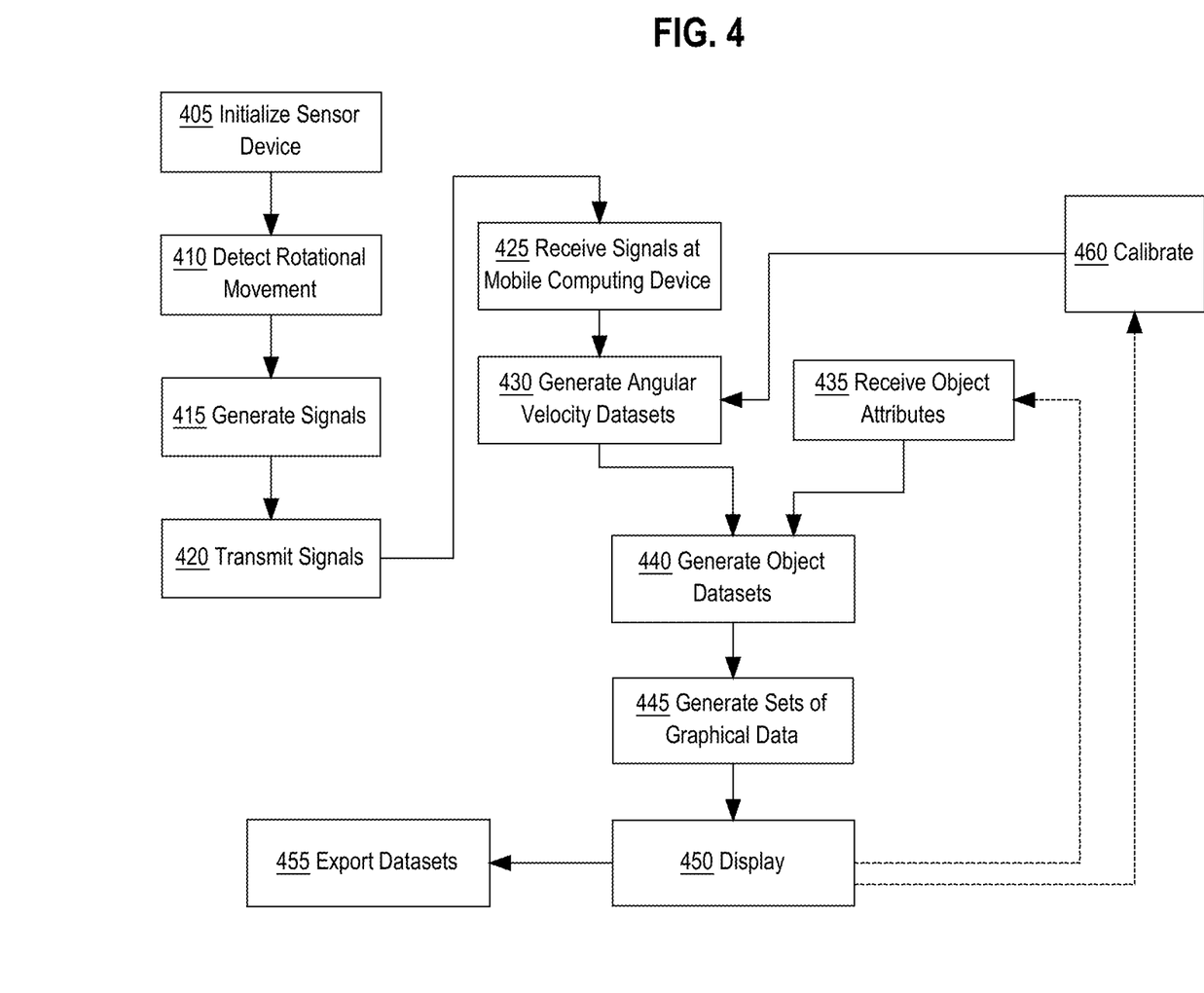
FIG. 4 illustrates an example process of detecting rotational movement of an object using the sensor device attached to the object and communicating data to the mobile computing device, which then calculates and displays the rotational movement data as part of a data series that describes the motion and position of the object as graphs.

FIG. 4 illustrates an example process of detecting rotational movement of an object using the sensor device attached to the object and communicating data to the mobile computing device, which then calculates and displays the rotational movement data as part of a data series that describes the motion and position of the object as graphs.

3.1. Detecting Rotational Movement

At block 405 the mobile computing device 110 initializes the sensor device 100 by initiating a communication session with the sensor device 100. In an embodiment, the mobile computing device 120 wirelessly communicates with the sensor device 100, which is currently attached to the object 110, to initialize a communication session to receive data from the sensor. Wireless communication may be implemented using different communication protocols including, but not limited to, Bluetooth, Bluetooth low energy, WiFi, Zigbee, or any other wireless protocol. In an embodiment, initialization may include sending a request to connect from the mobile computing device 120 to the sensor device 100. Once the request is sent to the sensor device 100, the mobile computing device 120 may wait for the successful pairing message from the sensor device 120.

At block 410, the gyroscope 330 in the sensor device 100 detects rotational movement of the sensor device 100 caused by the object 110 moving. For example, the object 110 may be a wheel with the sensor device 100 attached. As the wheel moves along a single plane, such as the x-axis, the gyroscope 330 within the sensor device 100 would detect that the sensor device 100 is rotating along the x-axis.

At block 415, the sensor device 100 generates one or more signals based on the detected rotational movement from the gyroscope 330. For example, if the gyroscope 330 detects a change in orientation along the x-axis, then the sensor device 100 would generate a signal that represents the orientation in degrees. In an embodiment, the generated signals may be digital signals that represent raw gyroscopic data such as 16-bit data values for each of the x, y, and z axes at specific time intervals. Other embodiments may use larger or smaller bit values that may be measured at differently configured times. For example, the mobile computing device 120 may configure the bit value size and sampling rate of the gyroscope 330.

In an embodiment, the signals may be stored temporarily in data storage 315. The purpose of storing the digital signal within the data storage 315 is to ensure data loss does not occur during transmission failure. In the case of transmission failure to the mobile computing device 120, the sensor device 100 may be configured to resend the stored data until an acknowledgement is received from the mobile computing device 120.

At block 420, the sensor device 100 transmits the one or more signals using a wireless radio 325 to the mobile computing device 120. In an embodiment, the wireless radio 325 receives the one or more signals from the microcontroller 320 and transmits the signals using wireless protocols such as, Bluetooth, Bluetooth low energy, WiFi, ZigBee, or any other commercially available wireless protocol.

3.2. Calculating Object Motion and Position

At block 425, the mobile computing device 120 receives the transmitted signals by the sensor device 100. In an embodiment, the mobile computing device 120 is configured to receive signals using many different wireless protocols such as Bluetooth, Bluetooth low energy, WiFi, ZigBee, or any other commercially available wireless protocol.

At block 430, the mobile computing device 120 generates one or more angular velocity datasets containing measurements based upon the received one or more signals. In an embodiment, the mobile computing device 120 is configured to assign timestamp values to each signal of the one or more signals received from the sensor device 100. The mobile computing device 120, contains a reference clock that generates timestamp values. The mobile computing device 120 then assigns timestamp values from the reference clock to the one or more signals. After timestamp values are assigned to each of the signals, the mobile computing device 120 converts the signals from 16-bit data values into angular velocity measurements with an associated timestamp value. In an embodiment, the angular velocity measurements may be calculated in units such as degrees per second. In other embodiments, depending on the level of preciseness desired, the angular velocity may be calculated in more precise units such as degrees per millisecond or degrees per microsecond. The level of preciseness may be based upon the sensitivity of the gyroscope 330 in the sensor device 100.

At block 435, the mobile computing device 120 receives object parameter information that describes one or more attributes of the object 110 to which the sensor device 100 is affixed. In an embodiment, the one or more attributes of the object 110 may include, but is not limited to, the diameter of the object 110. For example, if the object 110 is a wheel attached to a car, then the mobile computing device 120 may receive parameter information that describes the diameter of the wheel, for instance 20 inches. Attributes such as diameter may be used in conjunction with the angular velocity, calculated at block 430, to determine velocity, acceleration, and position of the object itself.

In an embodiment, the object parameter information may include attributes related to the object 110, such as attributes of mechanically connected objects. For example, if the sensor device 100 is affixed to object 110, which is a gear, and object 110 is mechanically connected to other gears that are connected to an axle of a car, then gear diameters and gear ratios of both the object 110 and the other gears may be used to calculate velocity, acceleration, and position of the car based upon the velocity, acceleration, and position of the object 110. For example, if the gear ratio between the object 110 and another gear attached to the axle is 2.0, where one revolution of the object 110 equals two revolutions of the other gear, then the velocity of the car with respect to the other gear may be calculated by dividing the velocity of object 110 by the gear ratio.

In an embodiment, the mobile device 120 may be configured to receive object parameter information from a touchscreen or other input device coupled to the mobile computing device 120. For example, the mobile computing device 120 may display on a touchscreen display input screens where a user may input object parameter information.

Figure 5A:
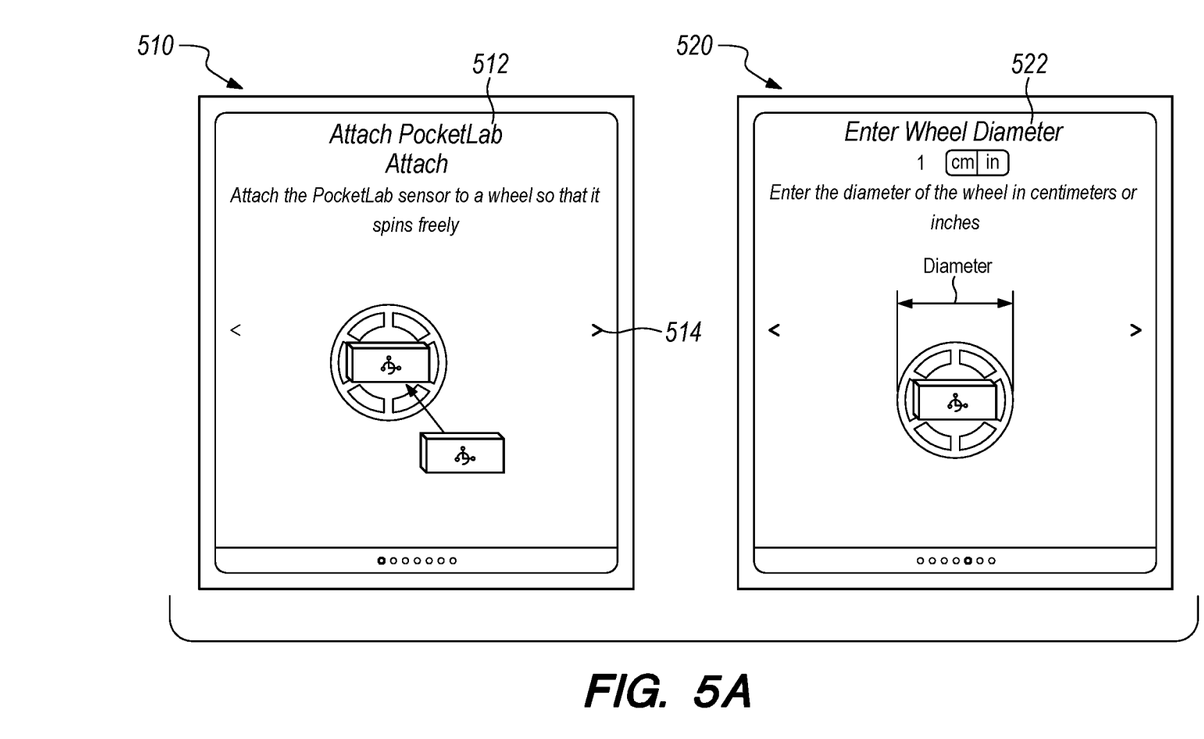
FIG. 5A, FIG. 5B, FIG. 5C each illustrate example input displays for inputting object parameter information.
Figure 5B:
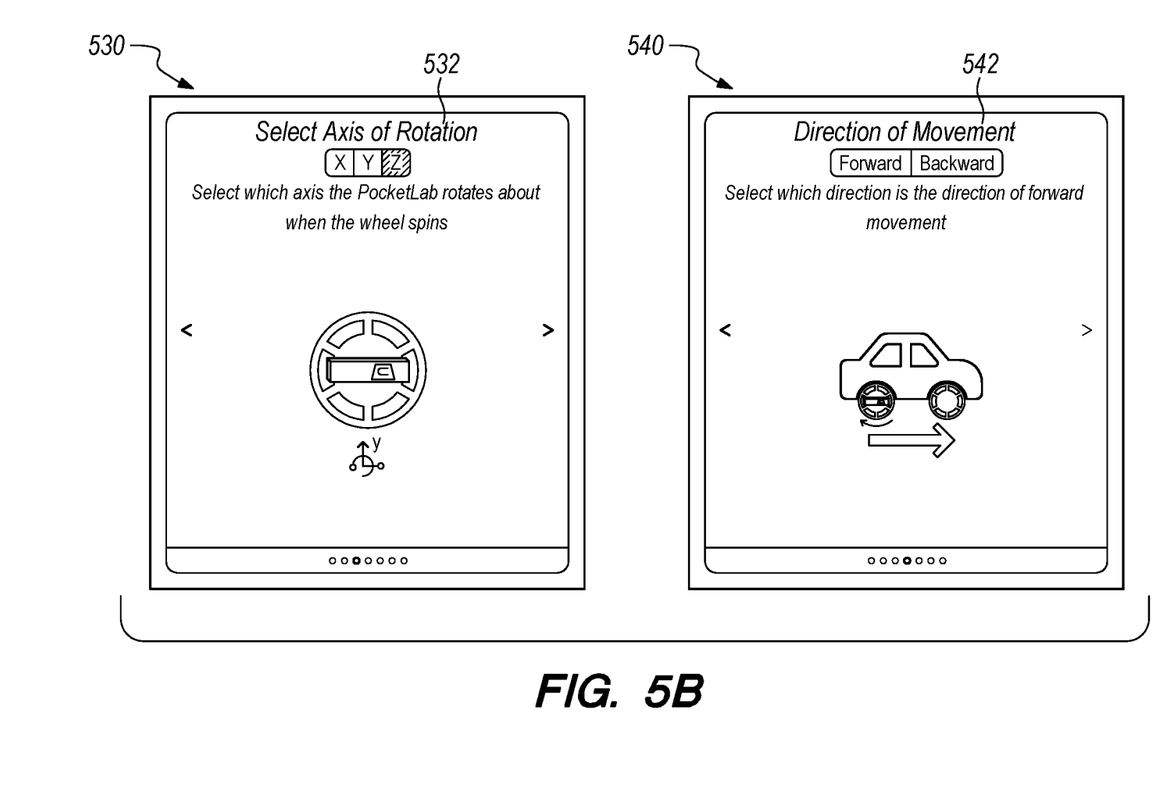
Figure 5C:
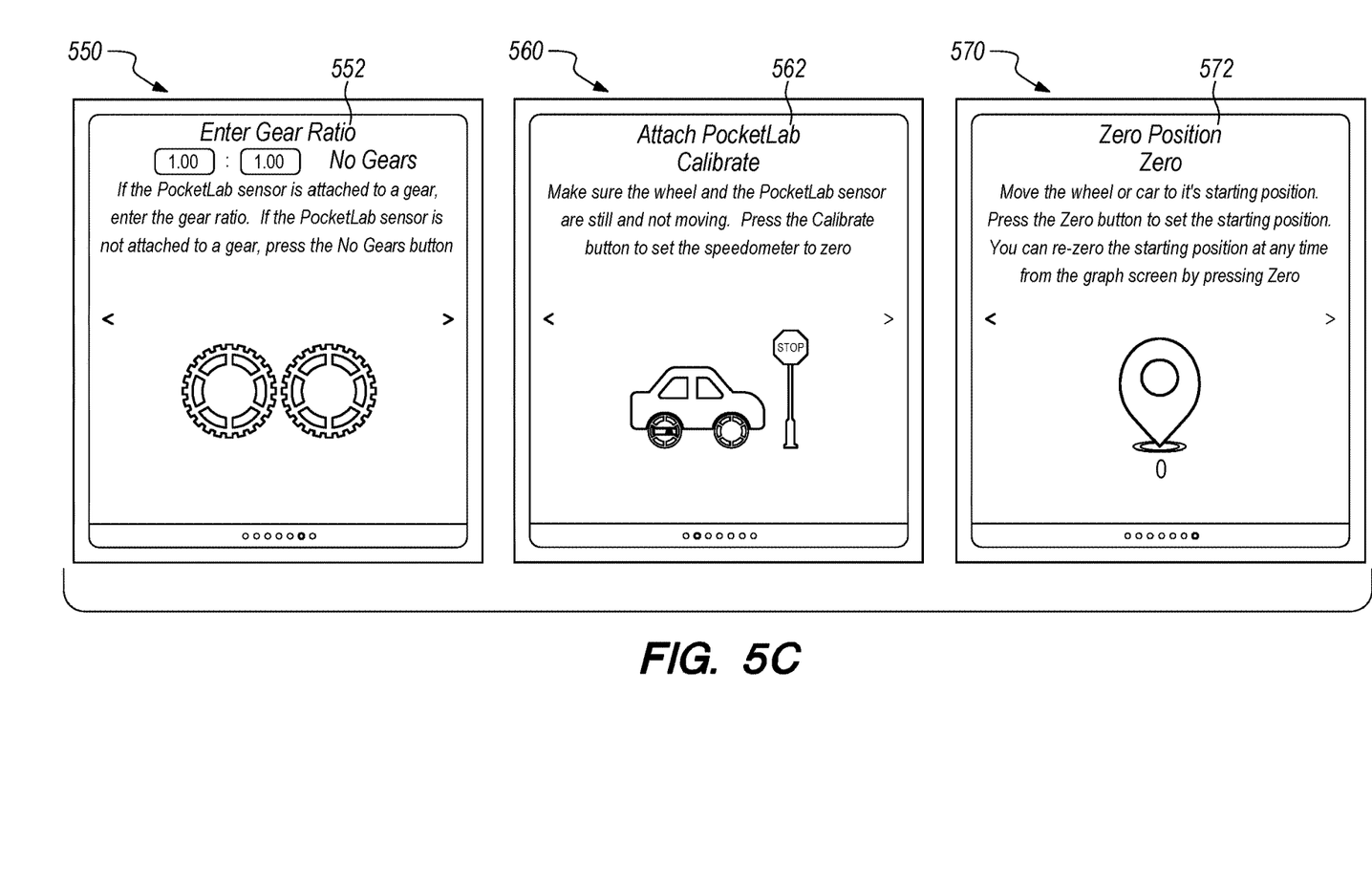

FIG. 5A, FIG. 5B, FIG. 5C illustrate example input displays for a user to input object parameter information.

Display 510 depicts a starting screen display where a user may input object parameter information. Display 510 contains instruction 512 that instruct the user to attach the sensor device 100 to the object 110, such as a wheel. Display 510 includes a navigation arrow 514 that enables the user to navigate to different configuration options for the sensor device 100 and the object 110.

In an embodiment, display 520 depicts an example configuration screen for entering the diameter of the object 110. In the embodiment displayed, input 522 allows input of a diameter of object 110 in either centimeters or inches. Other embodiments, may allow input of other object parameters related to the dimensions of the object 110. Display 530 depicts an example configuration screen for selecting a specific axis of rotation upon which the object 110 will rotate. Axis of rotation refers to the axis that upon which rotational movement of the object 110 will be sensed by the sensor device 100. For example, depending on how the sensor device 100 is attached different axes will sense rotational movement. Display 530 allows the user to specify the axis that will be associated with rotational movement of the object 110. In other embodiments, the sensor device 100 may be configured to detect and send rotational movement from each of the x, y, and z axes and the mobile device 120 may be configured to determine, based upon the changes in angular movement, which axis is associated with rotational movement of the object 110. In an embodiment, input 532 depicts an example selection box where the user may select which axis out of the x, y, z axes is associated with rotational movement of the object 110.

In an embodiment, display 540 depicts an example configuration screen for specifying a direction of movement for the object 110. By specifying a primary direction of movement, the mobile computing device 120 may associate positive values to the primary rotation direction of the object 110. Input 542 depicts an example input of radio buttons where the user may specify that the primary direction of rotation of the object 110 as either forward or backwards. Other embodiments may display the primary direction as either clockwise or counterclockwise.

In an embodiment, display 550 depicts an example configuration screen for specifying parameters of objects attached to the object 110. Specifically, input 552 is an example input for entering a gear ratio that describes a relationship between object 110 and another attached object. This example pertains to an embodiment where the sensor device 100 is attached to object 110, which may be a gear, and object 110 is mechanically connected to another gear that may be attached to an axle of a vehicle. The inputted gear ratio may then be used to convert angular velocity of the object 110 into velocity, acceleration, and position of the vehicle that contains the other gear.

Receiving object parameter information at block 435 is not limited to receiving individual inputs for diameter, axis of rotation, and direction of movement. In other embodiments, the mobile computing device 120 may be configured to receive object parameter information from one or more external data resources. For example, if the sensor device 100 is attached to a wheel of a particular production automobile, then the mobile computing device 120 may receive technical specifications from an external server that provides production wheel information, axle information, and gear ratio information that may be used to determine motion and position of the automobile depending on where the sensor device 100 is attached to the automobile.

Referring back to FIG. 4, at block 440 the mobile computing device generates object datasets of calculated data values that describe motion or positions of the object 110 over a particular period. In an embodiment, the object datasets may represent different sets of calculated data values that describe motion in terms of velocity or acceleration and data values that describe relative position of the object 110 at different periods of time. The object datasets are based on the one or more angular velocity datasets calculated at block 430 and the parameter information received at block 435.

In an embodiment, the mobile computing device 120 is configured to determine a dataset of that describes velocity of the object 110 based on angular velocity from the sensor device 100 and attributes of the object 110. For example, an angular velocity dataset may include angular velocity measurements in terms of degrees per second. The mobile computing device 120 may be configured to implement the following conversion equation to convert the angular velocity of the sensor device 100 into velocity measurements for the object 110:

$$velocity\_n=(angularVelocity\_n/360)*wheelDiameter*\pi*gearRatio$$

where velocity_n equals the velocity of the object 110 in meters per second and angularVelocity_n equals the angular velocity of the sensor device 100 in degrees per second. The angularVelocity_n is divided by 360, which represents the number of degrees per revolution, to determine the revolutions per second of the sensor device 100. Then the revolutions per second of the sensor device 100 are multipled by the wheelDiameter and $\pi$ to determine the meters per second of the object 110. In an embodiment, if the mobile computing device 120 is configured to determine the velocity of a vehicle that is attached to multiple gears and the sensor device 100, then the vehicle's velocity may be determined by multiplying the velocity of the object by the gear ratio, as depicted by the "gearRatio" variable in the above equation.

In another embodiment, the mobile computing device 120 is configured to implement other types of velocity formulas that incorporate angular velocity over multiple planes. For example, if the sensor device 100 is mounted on object 110 at a particular angle where the sensor device 100 detects the rotation of the object 110 along multiple planes, then the mobile computing device 120 may implement a velocity formula that account for the angle to which the sensor device 100 is mounted and the detected signals that indicate angular velocity across multiple planes. One such example may incorporate determining velocity using a particular plane incorporating the angle of orientation of the sensor device 100. In the following equation:

$$velocity\_n=(angularVelocity\_n/360)*wheelDiameter*\pi*gearRatio*cosine\ (\theta)$$

where cosine ($\theta$) represents the angle of orientation of the sensor device 100 relative to the axis of rotation. Examples of mounting the sensor device 100 at an angle relative to the axis of rotation may be necessary based on the shape of the object 110 and the mounting area or based on the speed of the rotation of the object 110 and the sensitivity of the sensor device 100. For example, if the object 110 is a gear that has a high revolution per minute speed, then the sensor device 100 may be mounted at an angle such that calculating velocity, using an equation that incorporates a cosine conversion, may allow the sensor device 100 to sense rotation at higher speeds than normally capable if the sensor device 100 was mounted in parallel with the axis of rotation.

In an embodiment, the mobile computing device 120 may generate an additional object dataset describing the acceleration of the object 110 using the calculated object dataset of velocity values. For example, the mobile computing device 120 may be configured to implement the following equation to calculate acceleration of the object 110:

$$acceleration\_n=(velocity\_n-velocity\_n-1)/(t\_n-t\_n-1)/9.80665$$

where acceleration_n is the average acceleration of the object 110 over a period of time specified by (t_n–t_n–1), based on the change in velocity specified by (velocity_n–velocity_n–1), and divided by 9.80665 which accounts for gravitation acceleration.

In an embodiment, an object dataset of relative positions of the object 110 may also be calculated using velocity of the object 110. For instance, relative position_n may be calculated as:

$$position\_n=position\_n-1+velocity\_n*(t\_n-t\_n-1)$$

where position_n is calculated from the previous position (position_n–1) multiplied by the velocity_n multiplied by the duration of time (t_n–t_n–1). In other embodiments, additional object datasets may be calculated using the velocity, acceleration, and relative position of the object 110.

In other embodiments, velocity, acceleration, and position may be calculated using other formulas, including but not limited to, public and private software libraries that provide formulas and expression libraries to calculate velocity, acceleration, and position of the object 110. One such example of a public library is the GNU scientific library which is available at https://www.gnu.org/software/gsl/.

Referring back to FIG. 4, at block 445 the mobile computing device 120 is configured to generate sets of graphical representations from the calculated data values within the generated object datasets. In an embodiment, the mobile computing device 120 generates two or more graphical representations that describe the motion or position of the object 110 at a particular point in time. Each graphical representation may be based on a subset of one or more calculated data values and each graphical representation may be associated with a particular time value. For example, the calculated velocity values from time t-10 to time t may be used to generate a graph of velocity values from times t-10 through t. The graphical representation may then be associated with a particular timestamp value, such as t. By doing so, a viewer of the graph may be able to trace the velocity from time t-10 to time tin a single graph. In an embodiment, additional graphs of velocity may be generated using other time ranges, such as t-11 through t-1. In an embodiment, the mobile computing device 120 may generate sets of graphs that each represent a range of times with each graph assigned a particular timestamp that represents a calculated data value that is displayed within the graph.

In an embodiment, the generated graphical representations may include graphical displays, such as speedometer indicating a velocity based on specific calculated data values at a specific time or an accelerometer indicating acceleration at a specific time.

In an embodiment, the mobile computing device 120 may generate multiple sets of graphs, where each set of graphs represent graphs of a particular type of measurement of motion or position. For example, one set of graphs may represent velocity graphs of the object 110 over time and another set of graphs may represent acceleration of the object 110 over time.

3.3. Displaying Object Motion and Position Data

At step 450 the mobile computing device may be configured to display, on a display screen, the graphs generated at step 445. In an embodiment, the mobile computing device 120 may select a graph from a set of graphs and display the graph on the display screen as a multi-axis graph. The displayed graph may be oriented such that the x-axis of the graph represents time. In an embodiment, the mobile computing device 120 may be configured to display a set of graphs sequentially as frames of a video such that a user can view the playback as a sequence of graphs showing changes in motion either in real-time or as a playback of the motion of the object 110.

In another embodiment, the mobile computing device 120 may be configured to select two or more graphs that have the same associated timestamp from two distinct set of graphs and display the two or more graphs on the display device. Each of the two or more graphs may be synchronized based upon their associated timestamps. The computing device 120 may then playback a series of the two or more graphs, synchronized by timestamp values, such that each of the graphs displayed are lined up by their x-axes, timestamp value. By doing so, the user may view a playback of multiple motion and positional measurements of the object 110.

In yet other embodiments, the mobile computing device 120 may be configured to display, on the display device, additional graphical representations, such as a speedometer or accelerometer, either separately or combined with one or more graphs.

Figure 6:
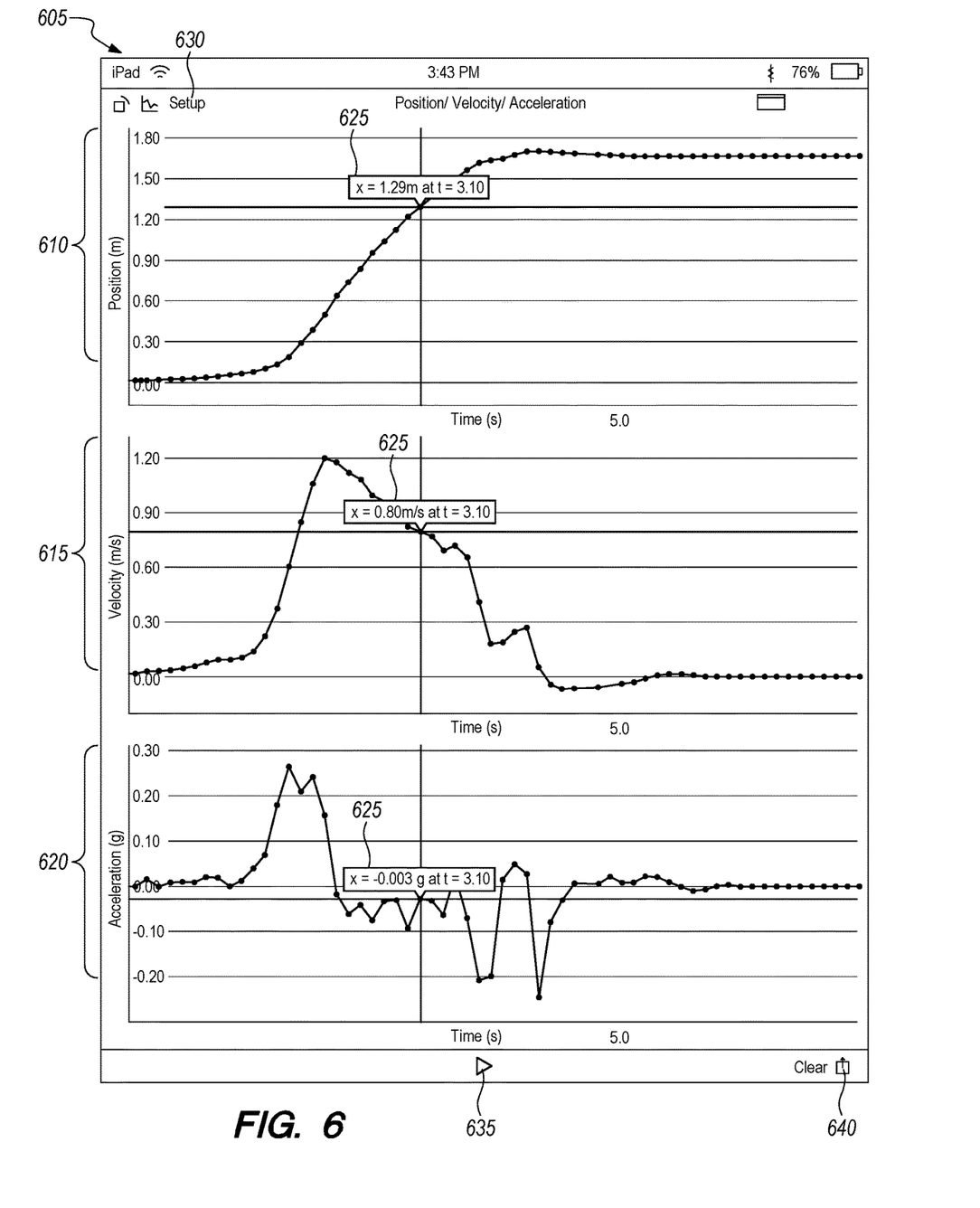
FIG. 6 depicts an example display of multiple graphs of object position, velocity, and acceleration displayed, in split-screen mode, aligned by timestamp value.

FIG. 6 depicts an example display of multiple graphs of object motion and position displayed, in split-screen mode, aligned by timestamp value.

For the example mobile computing device 120, display 605 depicts an example display of 3 graphs showing: position of object 110 as graph 610, velocity of object 110 as graph 615, and acceleration of object 110 as graph 620. Each of the graphs 610-620 are aligned by their timestamps values on the x-axis. Current value 625 displays the actual numerical value of both the x and y axes for each of the graphs. In an embodiment, the current value 625 displayed is associated with the timestamp value of the graph.

In an embodiment, display 605 may also include display option buttons 630 that allow the user to change display and calculation configurations for the data displayed. For example, a user may touch one of the buttons 630 to toggle between the number of graphs currently displayed. The user may also touch another one of the buttons 630 to change the object parameters used to calculate the graphs and values displayed. For instance, if the graph displays incorrect data based on an incorrectly inputted data value, then the user may update the object parameters in order to adjust the graphed data. In another example, if the sensor device 100 requires calibration, the user may select one of the buttons 630 to calibrate the incoming data from the sensor device 100 by zeroing the incoming values based on a resting position of the object 100.

In an embodiment, if the user selected one of the display option buttons 630 in order to update the object attributes, the mobile computing device 120 may proceed to block 435 to receive the updated object attributes in order to calculate subsequent object datasets and graphical representations of object motion and position.

Display 605 may also include a playback button 635 that is configured to sequentially display graphs from the set of graphs in order as a video of the movement of the object 110 so that a user may track measurements of the object as they occurred. In an embodiment, the playback button 635 may include one or more inputs/buttons that allow for playback functionality. For example, the playback button 635 once pressed may change to a play/pause button to play or pause the current sequence of graphs. Additionally, the playback button 635 may include a left curled arrow to step backwards a specific amount of frames, or a right curled arrow to step forward a certain number of frames.

In an embodiment, display of the graphs within display 605 may be modified by either zooming in or out using touchscreen finger gestures such as pinching, or spreading of two touching fingers. Touchscreen gestures may be implemented on the mobile computing device 120 by listening for touch events that trigger the mobile computing device 120 to recognize that the user is pinching or making a specific gesture on the touchscreen. By zooming in or out, the mobile computing device 120 updates the magnitude of the x-axis, y-axis, or both when displaying subsequent graphs. In an embodiment, zooming in or out on one graph may apply the same zoom effects to the other displayed graphs. Export button 640 is a button to export object 110 data to an external storage location.

At step 455, the mobile computing device 120 may export data describing motion and position of the object 110 to the server-side backend computer system 135. The server-side backend computer system 135 may be implemented using an external personal computer, external data server, external cloud server, or any other external storage medium that is not part of the mobile computing device 110. In an embodiment, the mobile computing device 120 may export sets of data including, but not limited to, signal data from the sensor device 100, calculated angular velocity data, the one or more object datasets, the sets of graphical representations, and any other data related to calculated values and object parameters received. In another embodiment, the mobile computing device 120 may export specifically formatted data files that include multiple datasets of object information including their corresponding timestamp values.

3.4. Data Calibration

At block 460, the mobile computing device 120 may be configured to calibrate the incoming data received from the sensor device 100. In an embodiment, the mobile computing device 120 may adjust the data conversation that occurs at block 430 to account for measured outside factors. For example, if the sensor device 100 is at a resting state and the incoming signals indicate values describing movement along a particular axis, then the mobile device 120 may be able to associate the incoming values as "zero" values for future calculations. By zeroing the incoming signal values, subsequent angular velocity calculations will more accurately indicate a resting state and other movements based upon the calibration of data. In another embodiment, a calibration request may include calculated data values used to generate the graphs displayed for removing erroneous values that show in one or more graphs. For example, when a user initiates calibration while viewing graph data, the mobile computing device 120 may include in the calibration request calculated data and signal data that was used to create the graph that prompted the user to initiate calibration.

Referring back to FIG. 5 displays 560 and 570 each show configuration displays for calibrating the incoming signal data. In display 560, input 562 shows a calibrate button that may be used to zero out incoming signal data. In display 570, input 572 shows a "zero" button that may be used to calibrate the incoming signal data and to start collection of signal data for generation of new graph representations of movement of the object 110. For example, if a user intends to run an experiment showing specific movement of the object 110, then the user may want to start at a specific point in time and the input 572 may be used to initiate the beginning of the experiment.

In another embodiment, the mobile computing device 120 may be configured to receive calibration input from external devices such as a speedometer or other computer that may be used to calibrate the sensor device 100, the mobile computing device 120, or both.

4. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
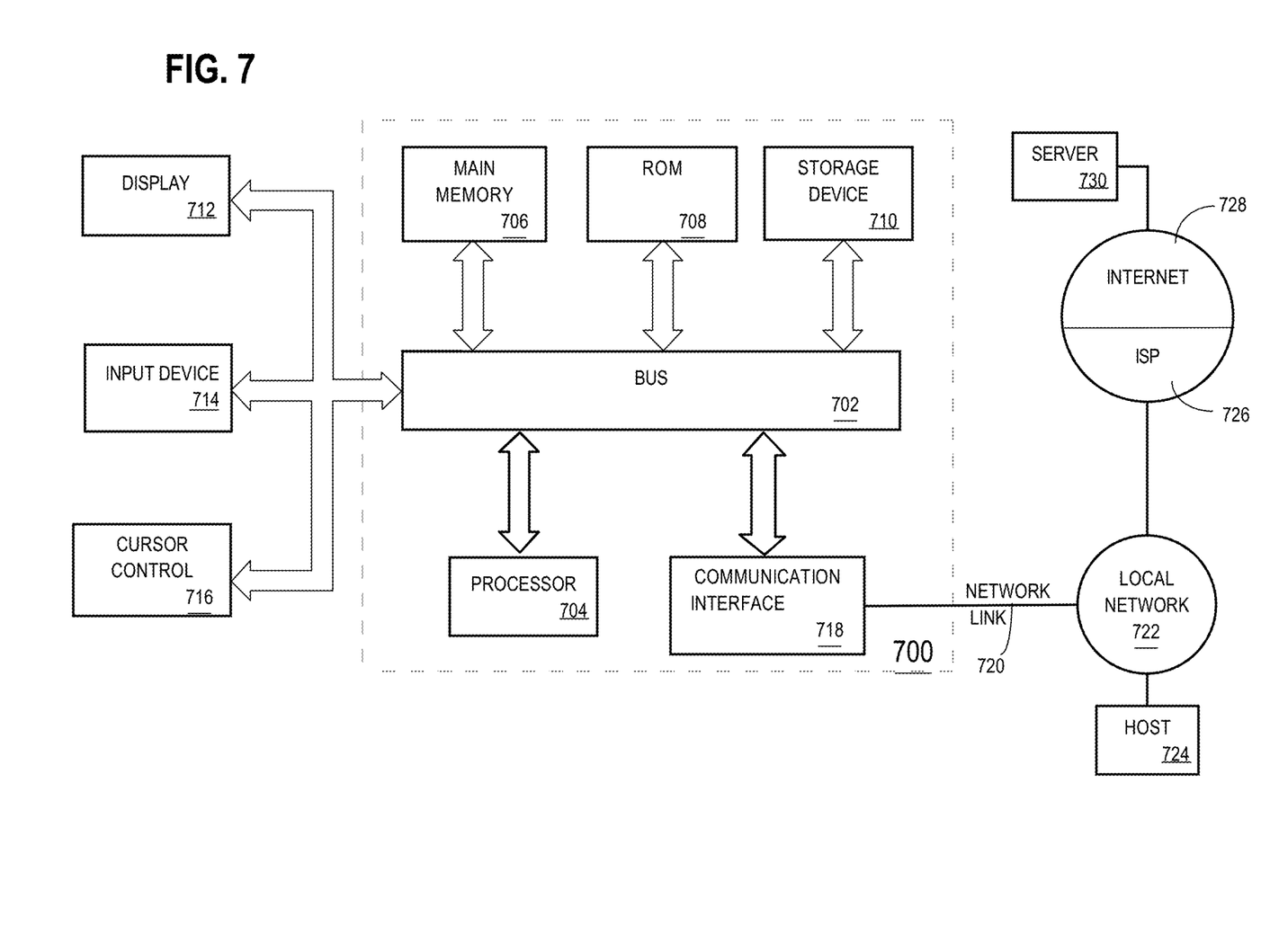
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722.

For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
   a sensor device that is affixed to an object comprising: one or more processors; a gyroscopic sensor coupled to the one or more processors and configured to measure rotational motion of the sensor device; a wireless network transceiver coupled to the one or more processors; a non-transitory computer-readable storage medium coupled to the one or more processors and storing one or more sequences of instructions which when executed by the one or more processors cause the one or more processors to perform:
   using the gyroscopic sensor, detecting rotational movement of the sensor device, the rotational movement of the sensor device being determined by the rotational movement of the object to which the sensor is affixed;
   generating one or more signals that represent rotational movement based on the detected rotational movement from the gyroscopic sensor;
   transmitting the one or more signals that represent rotational movement via the wireless network transceiver to a mobile computing device that is separate from the sensor device;
   the mobile computing device comprising a second non-transitory computer-readable storage medium storing downloadable application instructions which when downloaded to and executed by the mobile computing device cause the mobile computing device to perform:
   receiving the one or more signals that represent rotational movement from the sensor device;
   receiving object parameter information that describes one or more attributes of the object to which the sensor device is affixed;
   assigning, to the one or more signals that represent rotational movement, a timestamp value obtained from an internal clock of the mobile computing device;
   generating one or more angular velocity datasets comprising a plurality of values representing a plurality of measurements based on the one or more signals that represent rotational movement and the timestamp values that have been assigned to the one or more signals that represent rotational movement;
   generating one or more object datasets describing motion or position of the object over a particular period, each of the one or more object datasets comprising calculated data values with associated timestamps based on the object parameter information and the one or more angular velocity datasets, wherein the calculated data values are associated with timestamp values that were assigned to the one or more signals that represent rotational movement used to generate the plurality of values of the one or more angular velocity datasets;
   generating two or more sets of graphical representations from one or more sets of the calculated data values within the one or more object datasets, wherein each graphical representation of the two or more sets of graphical representations includes a subset of the one or more sets of the calculated data values and is associated with a particular timestamp value of the timestamp values;
   displaying, on a display device communicatively coupled to the mobile computing device, two or more graphs, each of the graphs obtained from a distinct set of the two or more sets of graphical representations.

2. The computer system of claim 1, further comprising downloadable application instructions which when executed cause calculating the data values, the data values comprising velocity data values of the object with respect to one or more particular planes.

3. The computer system of claim 1, further comprising downloadable application instructions which when executed cause calculating the data values, the data values comprising acceleration data values of the object with respect to one or more particular planes.

4. The computer system of claim 1, further comprising downloadable application instructions which when executed cause calculating the data values, the data values comprising position data values of the object with respect to one or more particular planes.

5. The computer system of claim 1, further comprising downloadable application instructions which when executed cause receiving the one or more attributes of the object including a diameter of the object.

6. The computer system of claim 5, further comprising downloadable application instructions which when executed cause receiving the one or more attributes of the object including a diameter of a second object mechanically connected to the object and one or more gear ratios describing attributes of the mechanical connection between the object and the second object.

7. The computer system of claim 6, further comprising downloadable application instructions which when executed cause generating the one or more object datasets including motion or positions of the second object over the particular period.

8. The computer system of claim 1, further comprising downloadable application instructions which when executed cause the mobile computing device to perform receiving a calibration request to calibrate the one or more signals received from the sensor device to define which signals of the one or more signals represent a resting state.

9. The computer system of claim 8, further comprising downloadable application instructions which when executed cause receiving the calibration request including calculated data values from the one or more sets of the calculated data values used to generate and display the two or more graphs.

10. The computer system of claim 9, further comprising downloadable application instructions which when executed cause receiving the calibration request including calibration data received from an external measurement device.

11. The computer system of claim 1, further comprising downloadable application instructions which when executed cause displaying the two or more graphs comprising:
- selecting the two or more graphs that have associated timestamp values that are equal; and
- displaying the two or more graphs within the display device such that x-axes represent timestamp values and the timestamp values on each x-axis of the two or more graphs are aligned.

* * * * *